United States Patent
Trinh et al.

(10) Patent No.: US 8,369,073 B2
(45) Date of Patent: Feb. 5, 2013

(54) SYSTEMS AND METHODS FOR CONNECTING MULTIPLE HARD DRIVES

(75) Inventors: Minh N. Trinh, Irvine, CA (US);
Mostafa Pakzad, Palos Verdes Peninsula, CA (US); Suleyman Attila Yolar, Irvine, CA (US); Peter H. Greilach, Murrieta, CA (US); Henry Kuo, Yorba Linda, CA (US); Linh G. Tran, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 297 days.

(21) Appl. No.: 12/895,816

(22) Filed: Sep. 30, 2010

(65) Prior Publication Data

US 2012/0081851 A1    Apr. 5, 2012

(51) Int. Cl.
*H05K 5/00* (2006.01)
*H05K 7/00* (2006.01)

(52) U.S. Cl. ......... 361/679.02; 361/679.01; 361/679.31; 361/679.32; 361/679.33; 361/724; 361/725; 361/726; 361/727

(58) Field of Classification Search .......... 361/679.01, 361/679.02, 679.31, 679.32, 679.33, 724, 361/725, 726, 727
See application file for complete search history.

(56) References Cited

U.S. PATENT DOCUMENTS

| | | | |
|---|---|---|---|
| 6,157,534 A * | 12/2000 | Gallagher et al. | 361/724 |
| 6,743,054 B2 | 6/2004 | Wu | |
| 6,914,784 B1 * | 7/2005 | Chilton et al. | 361/724 |
| 6,934,158 B1 * | 8/2005 | Teachout et al. | 361/725 |
| 7,085,137 B2 | 8/2006 | Smith et al. | |
| 7,092,253 B2 * | 8/2006 | Lam | 361/690 |
| 7,275,935 B2 | 10/2007 | Chen et al. | |
| 2009/0154088 A1 * | 6/2009 | Huang et al. | 361/679.33 |
| 2012/0026667 A1 * | 2/2012 | Atluri et al. | 361/679.31 |

* cited by examiner

*Primary Examiner* — Anthony Haughton (57) ABSTRACT

A multiple hard drive connection system includes a first backplane, a second backplane, and a card assembly. The first backplane includes a pass-through and a first socket, and couples to a control system such that the first socket is in electrical communication with the control system. The second backplane is adjacent to and spaced apart from the first backplane, includes a second socket aligned with the pass-through, and couples to the control system such that the second socket is in electrical communication with the control system. The card assembly includes a first edge card connected to the first socket and a second edge card extending through the pass-through and connected to the second socket. The card assembly couples to a hard drive such that the hard drive is in electrical communication with the control system via the first backplane, the second backplane, and the card assembly.

20 Claims, 6 Drawing Sheets

SYSTEMS AND METHODS FOR CONNECTING MULTIPLE HARD DRIVES

FIELD

The present invention generally relates to hard drive connections and, in particular, relates to systems and methods for connecting multiple hard drives.

BACKGROUND

Hard drives may be tested for operation under various conditions. For example, hard drives may be tested for operation when placed in an environment subject to various temperatures. However, a control system for operating the hard drives is typically placed in a different environment that is not subject to the various temperatures that the hard drives are subjected to. It is therefore advantageous to provide a multiple hard drive connection system that connects the hard drives in one environment to the control system in another environment.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In certain instances, well-known structures and techniques have not been shown in detail so as not to obscure the subject technology.

Various interconnections may be used to connect hard drives in one environment to a control system in another environment. According to various aspects of the subject technology, a multiple hard drive connection system is provided that reduces the complexity of interconnections used to connect the hard drives in one environment to the control system in another environment. In some aspects, reducing the complexity of the interconnections may provide the advantages of lower loss and improved signal integrity. In some aspects, the multiple hard drive connection system insulates the temperature in the environment that the hard drives are located from the environment that the control system is located.

Figure 1:
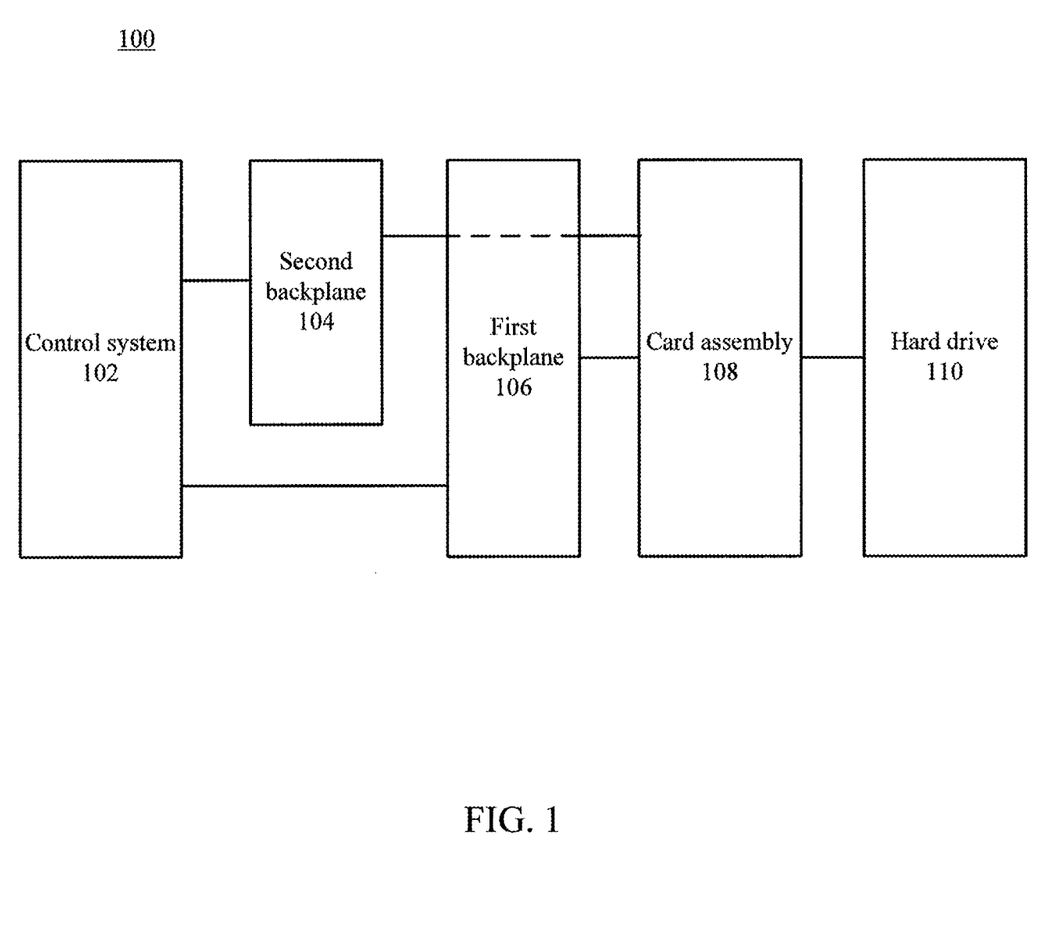
FIG. 1 is a block diagram of a multiple hard drive connection system, in accordance with various aspects of the subject technology.

FIG. 1 is a block diagram of multiple hard drive connection system 100, in accordance with various aspects of the subject technology. Multiple hard drive connection system 100 comprises card assembly 108 connected to hard drive 110. Multiple hard drive connection system 100 also comprises first backplane 106 connecting card assembly 108 to control system 102. Multiple hard drive connection system 100 also comprises second backplane 104 connecting card assembly 108 to control system 102. Thus, control system 102 is connected to hard drive 110 via second backplane 104, first backplane 106, and card assembly 108. Although only a single card assembly 108 and a single hard drive 110 is shown in FIG. 1, multiple hard drive connection system 100 may connect multiple hard drives to control system 102 via second backplane 104, first backplane 106, and multiple card assemblies.

According to various aspects of the subject technology, various signals may be routed between control system 102 and hard drive 110 for controlling the operation of hard drive 110. In some aspects, first backplane 106 may be a module control backplane (MCB) configured to route a power signal between control system 102 and hard drive 110, and second backplane 104 may be a host bus adapter (HBA) configured to route a data signal between control system 102 and hard drive 110. However, first backplane 106 and second backplane 104 may be other suitable backplanes for routing various signals between control system 102 and hard drive 110. In some aspects, first backplane 106 and/or second backplane 104 may be printed circuit boards or other suitable structures for routing the signals between control system 102 and hard drive 110.

Figure 2:
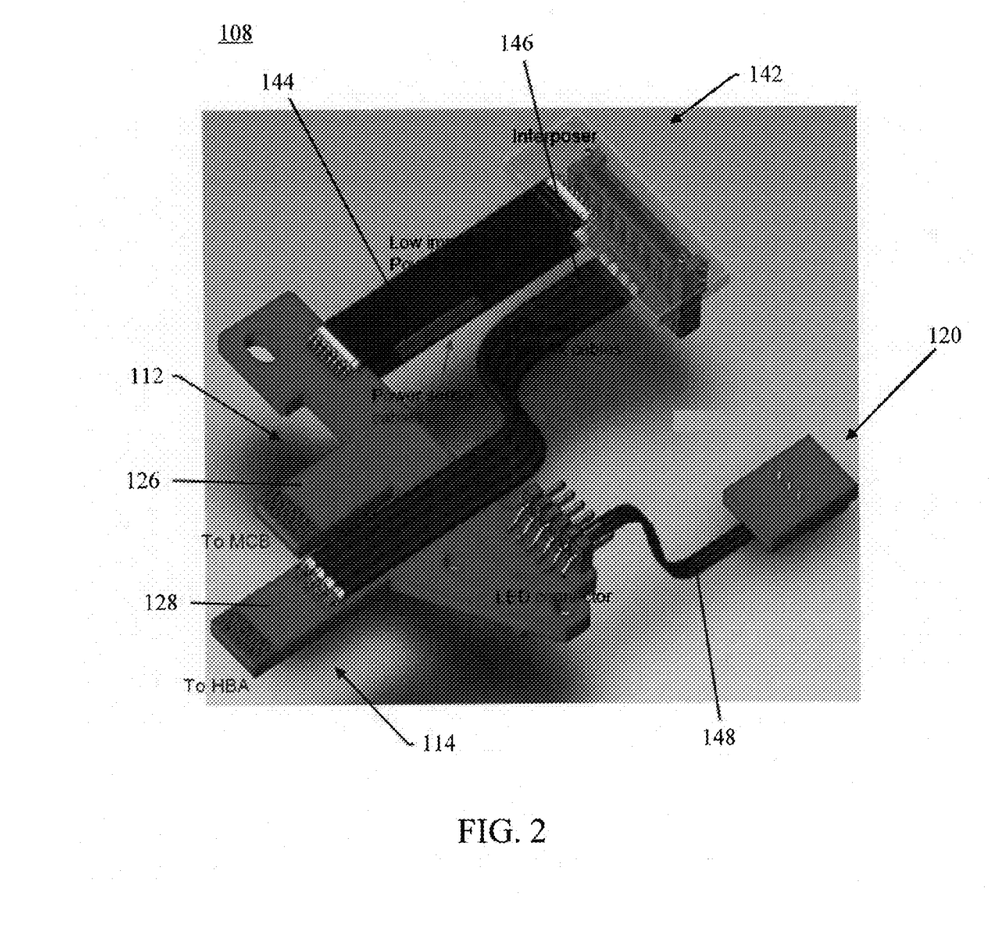
FIG. 2 illustrates a perspective view of a card assembly, in accordance with various aspects of the subject technology.

FIG. 2 illustrates a perspective view of card assembly 108, in accordance with various aspects of the subject technology. Card assembly 108 comprises first edge card 112 having extension portion 126 configured to connect to first backplane 106. Card assembly 108 also comprises second edge card 114 having extension portion 128 configured to connect to second backplane 104. In some aspects, first edge card 112 and second edge card 114 are coplanar. In some aspects, first edge card 112 and second edge card 114 are integral with one another. However, first edge card 112 and second edge card 114 may be in other configurations relative to one another provided that first edge card 112 may connect to first backplane 106 at the same time as second edge card 114 connects to second backplane 104.

Card assembly 108 is also configured to connect to hard drive 110. For example, card assembly 108 comprises first hard drive interface connector 142 configured to connect to a first port of hard drive 110. Card assembly 108 comprises first cable 144 connecting at least one of first edge card 112 and second edge card 114 to first hard drive interface connector 142. Card assembly 108 also comprises second cable 146 connecting at least one of first edge card 112 and second edge card 114 to first hard drive interface connector 142. First cable 144 may be a power cable such as a power sense cable for providing low power impedance. Second cable 146 may be a twinaxial cable for providing a high speed serial link. For example, the first port of hard drive 110 may be a serial attached small computer system interface (SCSI) and/or serial advanced technology attachment (SATA) port. Thus, up to 10 gigabits per second of data may be transmitted using second cable 146.

In some aspects, card assembly 108 further comprises second hard drive interface connector 120 configured to connect to a second port of hard drive 110. Card assembly 108 comprises third cable 148 configured to connect at least one of first edge card 112 and second edge card 114 to second hard drive interface connector 120. In some aspects, third cable 148 may be a cable suitable for low speed serial input/output (SIO) communication. Although FIG. 2 illustrates card assembly 108 having first hard drive interface connector 142 and second hard drive interface connector 120, card assembly 108 may comprise fewer or more hard drive interface connectors depending on the number of ports available on hard drive 110, the desired amount of information to be transmitted to and from hard drive 110, the size of card assembly 108, etc. In some aspects, card assembly 108 may comprise fewer or more cables to connect the hard drive interface connectors to first edge card 112 and/or second edge card 114. These cables may be power cables, twinaxial cables, SIO/option cables, or any other suitable cables for communicating signals.

Figure 3:
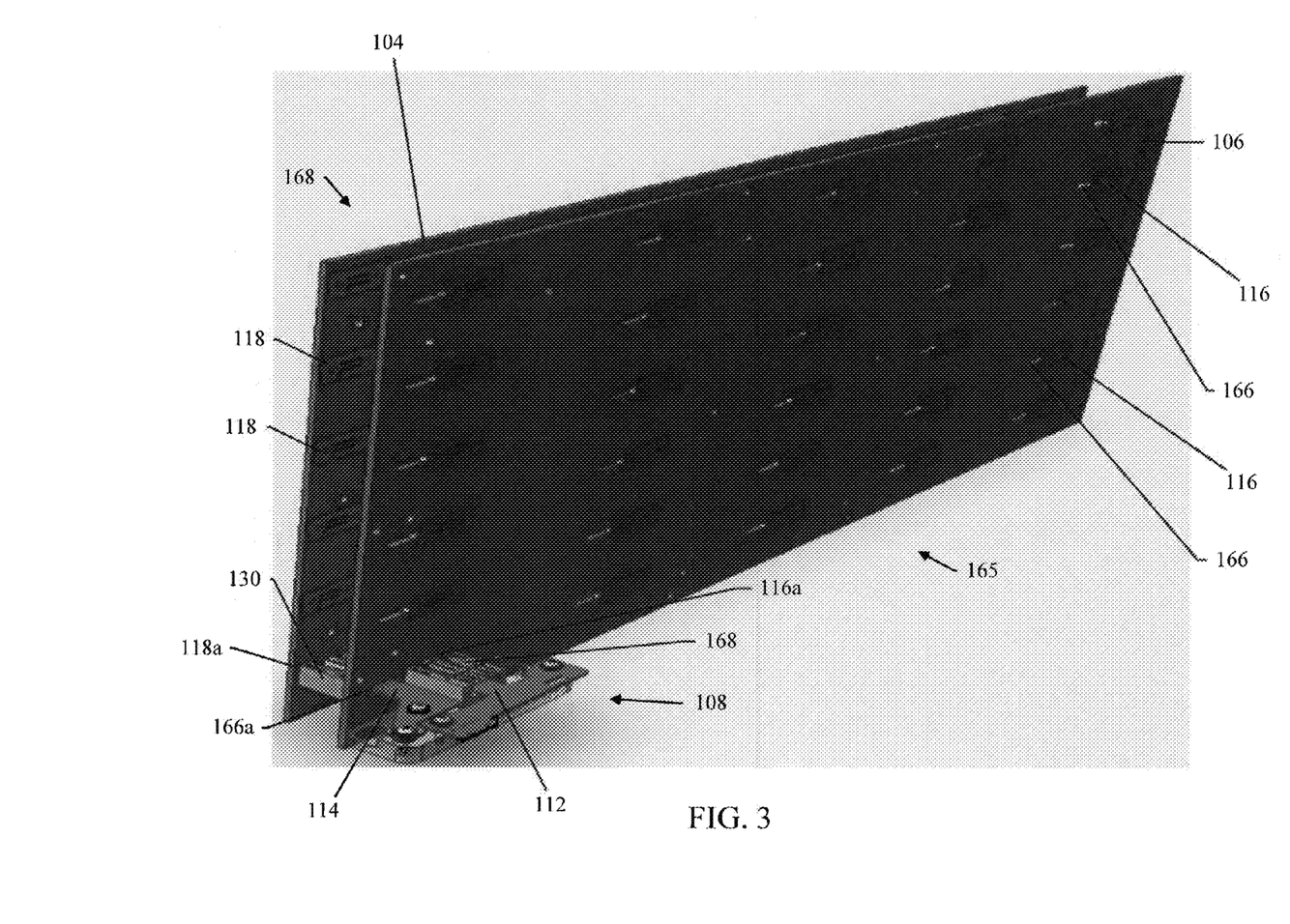
FIG. 3 illustrates a perspective view of a card assembly connected to a first backplane and a second backplane, in accordance with various aspects of the subject technology.

FIG. 3 illustrates a perspective view of card assembly 108 connected to first backplane 106 and second backplane 104, in accordance with various aspects of the subject technology. First backplane 106 comprises a plurality of pass-throughs 166 and a plurality of first sockets 116. In some aspects, first backplane 106 is configured to couple to control system 102 such that the plurality of first sockets 116 is in electrical communication with control system 102. Second backplane 104 is adjacent to and spaced apart from first backplane 106. In some aspects, first backplane 106 is parallel to second backplane 104. Second backplane 104 comprises a plurality of second sockets 118 each aligned with a respective pass-through 166 and configured to couple to control system 102 on a side 168 of second backplane 104 opposite first backplane 106 such that the plurality of second sockets 118 is in electrical communication with control system 102. In some aspects, control system 102 is disposed on side 168 such that control system 102 is not exposed to the various temperatures that hard drive 110 is exposed to in side 165 for testing the operation of hard drive 110 under the various temperatures.

In some aspects, multiple hard drive connection system 100 comprises one or more expansion cards configured to couple control system 102 to second backplane 104. For example, the one or more expansion cards may be peripheral component interconnect (PCI) expansion cards or PCI express expansion cards used to connect control system 102 to ports on side 168 of second backplane 104.

For purposes of illustration, a single card assembly 108 is shown. However, a plurality of card assemblies may be used such that each card assembly may connect a respective hard drive to first backplane 106 and second backplane 104. Card assembly 108 is configured to couple to hard drive 110 on side 165 of first backplane 106 opposite second backplane 104 (e.g., by using first hard drive interface connector 142, second hard drive interface connector 120, first cable 144, second cable 146, and third cable 148 as described with respect to FIG. 2). In some aspects, hard drive 110 is disposed on side 165 and may be exposed to the various temperatures for testing the operation of hard drive 110 under the various temperatures. In some aspects, first backplane 106 and second backplane 104 separate and insulate side 165 from side 168.

According to certain aspects, first edge card 112 of card assembly 108 is connected to first socket 116a of the plurality of first sockets 116. Second edge card 114 of card assembly 108 extends through pass-through 166a of the plurality of pass-throughs 166 and is connected to second socket 118a of the plurality of second sockets 118. Card assembly 108 is configured to couple to hard drive 110 such that hard drive 110 is in electrical communication with control system 102 via first backplane 106, second backplane 104, and card assembly 108. Because second edge card 114 may extend through pass-through 166a to connect to second socket 118a, card assembly 108 allows hard drive 110 to connect to both first backplane 106 and second backplane 104 at the same time. Thus, communication between control system 102 and hard drive 110 may occur without the need to route signals from first backplane 106 to second backplane 104 and vice versa, thereby reducing the complexity of the interconnections between control system 102 and hard drive 110.

According to various aspects of the subject technology, shrouds may be used to guide first edge card 112 and second edge card 114 into connecting to first backplane 106 and second backplane 104, respectively. For example, extension portion 126 of first edge card 112 extends through shroud 168. Shroud 168 may be used to guide extension portion 126 of first edge card 112 to connect to first socket 116a. In some aspects, extension portion 128 of second edge card 114 extends through shroud 130. Shroud 130 may be used to guide second edge card 114 to connect to second socket 118a. In some aspects, shroud 130 may also be used to prevent exchange of temperature between side 165 and side 168. The shrouds may comprise plastic or other suitable material for guiding the edge cards and/or for insulating temperature.

Figure 4A:
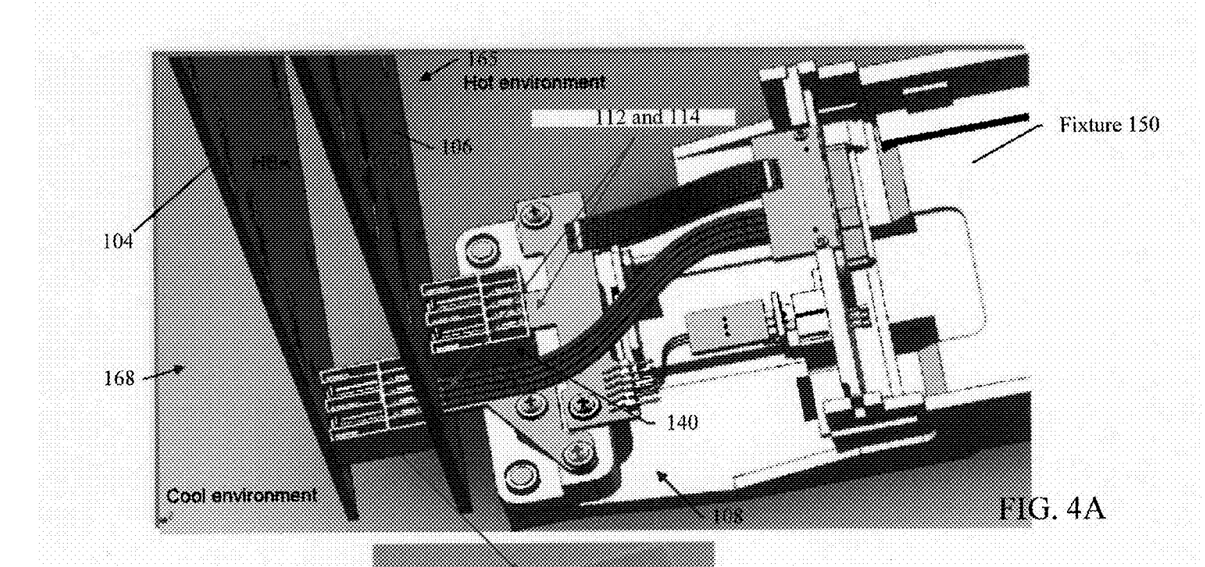
FIG. 4A illustrates a card assembly connecting a first backplane and a second backplane to a fixture, in accordance with various aspects of the subject technology.
Figure 4B:
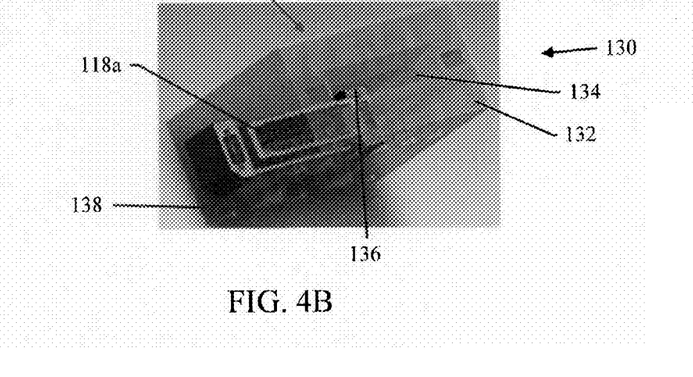
FIG. 4B illustrates a perspective view of a shroud, in accordance with various aspects of the subject technology.

FIG. 4A illustrates card assembly 108 connecting first backplane 106 and second backplane 104 to fixture 150, in accordance with various aspects of the subject technology. Fixture 150 is configured to hold hard drive 110 so that card assembly 108 may couple to hard drive 110 disposed in fixture 150. As shown in FIG. 4A, shroud 130 is arranged between first backplane 106 and second backplane 104. Extension portion 128 of second edge card 114 is disposed between first backplane 106 and second backplane104, and extends through shroud 130 to connect to second socket 118a. FIG. 4B illustrates a perspective view of shroud 130, in accordance with various aspects of the subject technology. In some aspects, first side 132 of shroud 130 abuts first backplane 106. First slot 134 defined in first side 132 is sized to receive extension portion 128 of second edge card 114 into cavity 136 of shroud 130. In some aspects, second side 138 abuts second backplane 104. A second slot defined in second side 138 is sized to receive second socket 118a. Thus, extension portion 128 of second edge card 114 extends through first slot 134 into cavity 136 to connect to second socket 118a.

According to certain aspects, shroud 130 encapsulates extension portion 128 of second edge card 114. First side 132 is sealed against first backplane 106 and second side 138 is sealed against second backplane 104. Thus, shroud 130 may prevent thermal exchange between side 165 and side 168. Because hard drive 110 is disposed on side 165 and subjected to various temperatures (e.g., hot temperatures) for testing the operation of hard drive 110 under these temperatures, shroud 130, first backplane 106, and second backplane 104 may insulate the various temperatures that hard drive 110 is subjected to on side 165 from control system 102 on side 168.

According to certain aspects, shroud 140 is also mounted on first backplane 106 to guide first edge card 112 into connecting to first socket 116a. Similar to shroud 130, a first slot is defined in a first side of shroud 140 and is sized to receive extension portion 126 of first edge card 112 into a cavity of shroud 140. A second side of shroud 140 abuts first backplane 106, and a second slot defined in the second side of shroud 140 is sized to receive first socket 116a. Extension portion 126 of first edge card 112 extends through the first slot defined in the first side of shroud 140 into the cavity of shroud 140 to connect to first socket 116a.

Figure 5:
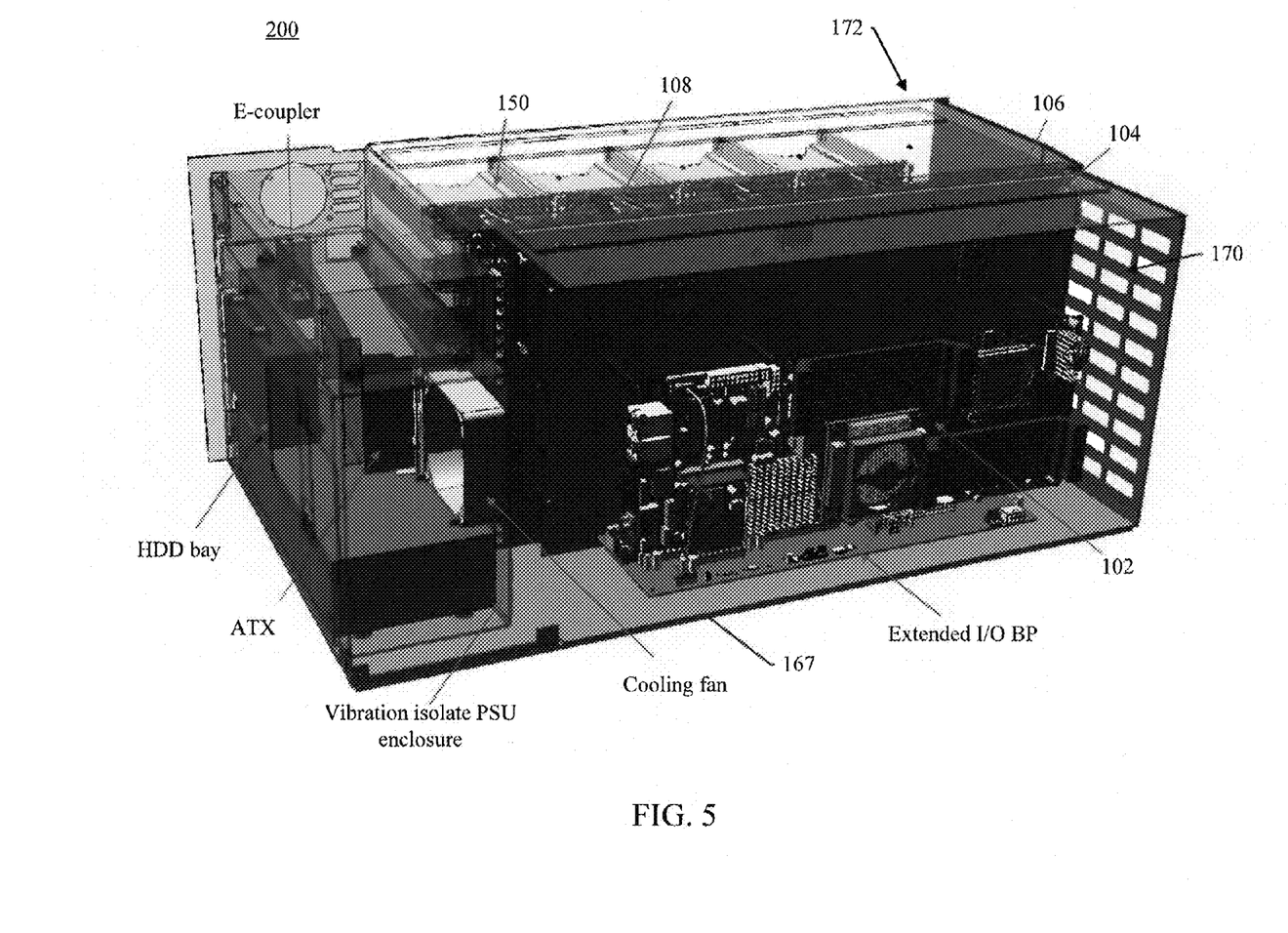
FIG. 5 illustrates a perspective view of a hard drive test system, in accordance with various aspects of the subject technology.

FIG. 5 illustrates a perspective view of hard drive test system 200, in accordance with various aspects of the subject technology. Hard drive test system 200 may be used to test the operation of multiple hard drives placed in an environment subject to various temperatures. Hard drive test system 200 comprises housing 167 and control system 102 arranged in first compartment 170 of housing 167. Hard drive test system 200 also comprises first backplane 106 arranged in housing 167. First backplane 106 comprises a plurality of pass-throughs 166 and a plurality of first sockets 116. First backplane 106 is coupled to control system 102 such that the plurality of first sockets 116 is in electrical communication with control system 102. Hard drive test system 200 also comprises second backplane 104 arranged in housing 167 and adjacent to and spaced apart from first backplane 106. Second backplane 104 comprises a plurality of second sockets 118 each aligned with a respective pass-through 166 of the plurality of pass-throughs 166. Second backplane 104 is coupled to control system 102 on a side 168 of second backplane 104 opposite first backplane 106 such that the plurality of second sockets 118 is in electrical communication with control system 102. For example, first compartment 170 is on side 168.

Hard drive test system 200 also comprises a plurality of fixtures 150 arranged in second compartment 172 of housing 167. Each fixture of the plurality of fixtures 150 is configured to hold a respective hard drive. Hard drive test system 200 also comprises a plurality of card assemblies 108 each having first edge card 112 connected to a respective first socket 116 of the plurality of first sockets 116 and second edge card 114 extending through a respective pass-through 166 of the plurality of pass-throughs 166 and connected to a respective second socket 118 of the plurality of second sockets 118. The plurality of card assemblies 108 are configured to couple to the plurality of hard drives such that the plurality of hard drives is in electrical communication with control system 102 via first backplane 106, second backplane 104, and the plurality of card assemblies 108. First backplane 106 is configured to couple to the plurality of hard drives on side 165 of first backplane 106 opposite second backplane 104. For example, second compartment 172 is on side 165.

According to various aspects of the subject technology, first backplane 106 and second backplane 104 separate and insulate first compartment 170 from second compartment 172. Thus, the plurality of hard drives disposed in second compartment 172 may be exposed to various temperatures without affecting the temperature in first compartment 170 where control system 102 is disposed. For example, the temperature in second compartment 172 may be greater than the temperature in first compartment 170. By separating and insulating first compartment 10 from second compartment 172, control system 102 is not subjected to the greater temperature in second compartment 172, thereby protecting control system 102 from the greater temperature that the plurality of hard drives are subjected to.

Figure 6:
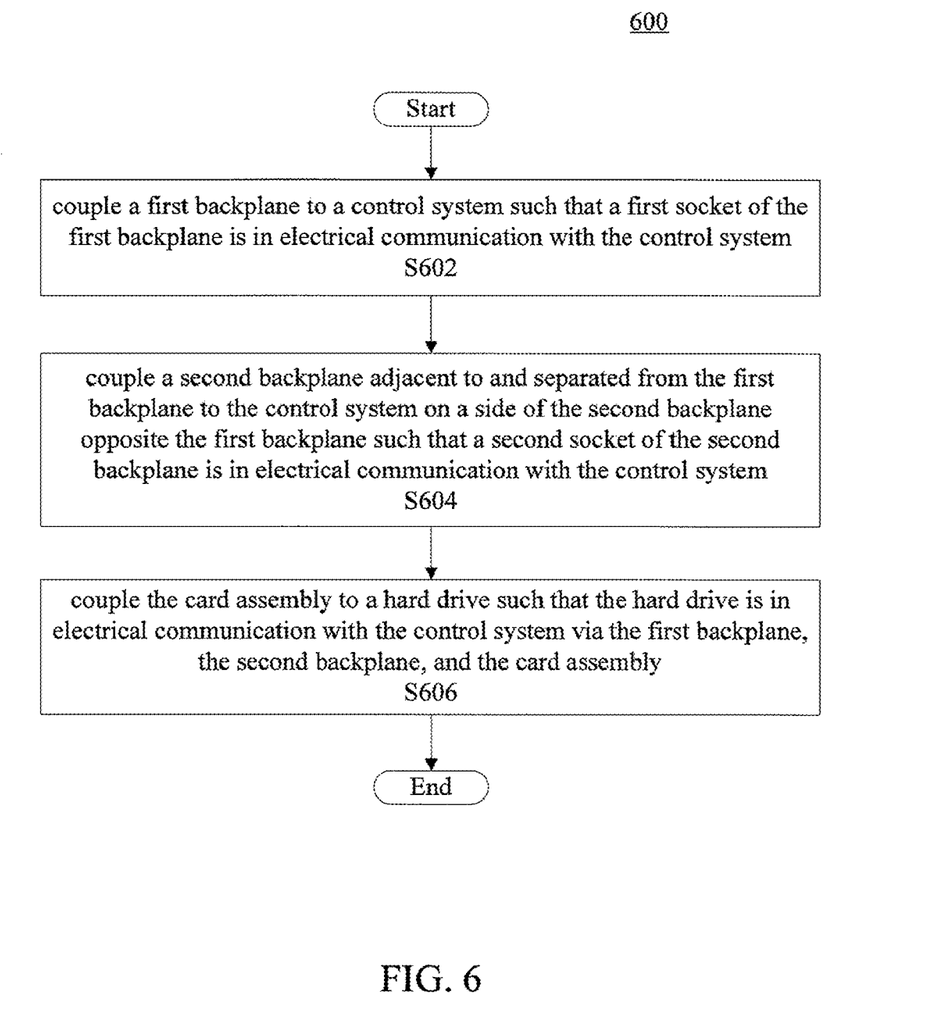
FIG. 6 illustrates a method of connecting multiple hard drives to a control system, in accordance with various aspects of the subject technology.

FIG. 6 illustrates method 600 of connecting multiple hard drives to a control system, in accordance with various aspects of the subject technology. Method 600 comprises coupling a first backplane to a control system such that a first socket of the first backplane is in electrical communication with the control system (step S602). Method 600 also comprises coupling a second backplane adjacent to and spaced apart from the first backplane to the control system on a side of the second backplane opposite the first backplane such that a second socket of the second backplane is in electrical communication with the control system (step S604). In some aspects, the second socket is aligned with a pass-through of the first backplane. A card assembly comprises a first edge card connected to the first socket and a second edge card extending through the pass-through of the first backplane and connected to the second socket. Method 600 also comprises coupling the card assembly to a hard drive such that the hard drive is in electrical communication with the control system via the first backplane, the second backplane, and the card assembly (step S606). The first backplane is coupled to the hard drive on a side of the first backplane opposite the second backplane.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A multiple hard drive connection system comprising:
 a first backplane comprising a pass-through and a first socket, the first backplane configured to couple to a control system such that the first socket is in electrical communication with the control system;
 a second backplane adjacent to and spaced apart from the first backplane, the second backplane comprising a second socket aligned with the pass-through and configured to couple to the control system on a side of the second backplane opposite the first backplane such that the second socket is in electrical communication with the control system; and
 a card assembly having a first edge card connected to the first socket and a second edge card extending through the pass-through and connected to the second socket, the card assembly configured to couple to a hard drive such that the hard drive is in electrical communication with the control system via the first backplane, the second backplane, and the card assembly, the first backplane configured to couple to the hard drive on a side of the first backplane opposite the second backplane.

2. The system of claim 1, further comprising a shroud arranged between the first backplane and the second backplane, wherein an extension portion of the second edge card disposed between the first backplane and the second backplane extends through the shroud.

3. The system of claim 2, wherein a first side of the shroud abuts the first backplane, wherein a first slot defined in the first side is sized to receive the extension portion of the second edge card into a cavity of the shroud, wherein a second side abuts the second backplane, wherein a second slot defined in the second side is sized to receive the second socket, and wherein the extension portion of the second edge card extends through the first slot into the cavity to connect to the second socket.

4. The system of claim 3, wherein the shroud encapsulates the extension portion of the second edge card, wherein the first side is sealed against the first backplane, and wherein the second side is sealed against the second backplane.

5. The system of claim 2, wherein the shroud comprises plastic.

6. The system of claim 1, wherein the first backplane is parallel to the second backplane.

7. The system of claim 1, wherein the first backplane is a module control backplane configured to route a power signal between the control system and the hard drive, and wherein the second backplane is a host bus adapter configured to route a data signal between the control system and the hard drive.

8. The system of claim 1, wherein the card assembly comprises:
 a first hard drive interface connector configured to connect to a first port of the hard drive;
 a first cable connecting at least one of the first edge card and the second edge card to the first hard drive interface connector;
 a second cable connecting at least one of the first edge card and the second edge card to the first hard drive interface connector;
 a second hard drive interface connector configured to connect to a second port of the hard drive; and
 a third cable configured to connect at least one of the first edge card and the second edge card to the second hard drive interface connector.

9. The system of claim 8, wherein the first cable is a power cable, and wherein the second cable is a twinaxial cable.

10. The system of claim 1, further comprising one or more expansion cards configured to couple the control system to the second backplane.

11. The system of claim 1, further comprising a shroud mounted on the first backplane, wherein an extension portion of the first edge card extends through the shroud.

12. The system of claim 11, wherein a first slot is defined in a first side of the shroud and is sized to receive the extension portion of the first edge card into a cavity of the shroud, wherein a second side abuts the first backplane, wherein a second slot defined in the second side is sized to receive the first socket, and wherein the extension portion of the first edge card extends through the first slot into the cavity to connect to the first socket.

13. The system of claim 1, wherein the first edge card and the second edge card are coplanar, and wherein the first edge card and the second edge card are integral with one another.

14. The system of claim 1, wherein the pass-through is one of a plurality of pass-throughs of the first backplane and the first socket is one of a plurality of first sockets of the first backplane, wherein the first backplane is configured to couple to the control system such that the plurality of first sockets is in electrical communication with the control system, wherein the second socket is one of a plurality of second sockets of the second backplane, wherein each of the plurality of second sockets is aligned with a respective pass-through of the plurality of pass-throughs, wherein the second backplane is configured to couple to the control system such that the plurality of second sockets is in electrical communication with the control system, wherein the card assembly is one of a plurality of card assemblies of the multiple hard drive connection system, wherein each of the plurality of card assemblies includes a first edge card connected to a respective first socket of the plurality of first sockets and a second edge card extending through a respective pass-through of the plurality of pass-throughs and connected to a respective second socket of the plurality of second sockets, wherein the hard drive is one of a plurality of hard drives, and wherein the plurality of card assemblies is configured to couple to the plurality of hard drives such that the plurality of hard drives is in electrical communication with the control system via the first backplane, the second backplane, and the plurality of card assemblies.

15. A method of connecting multiple hard drives to a control system, the method comprising:
 coupling a first backplane to a control system such that a first socket of the first backplane is in electrical communication with the control system;
 coupling a second backplane adjacent to and spaced apart from the first backplane to the control system on a side of the second backplane opposite the first backplane such that a second socket of the second backplane is in electrical communication with the control system, wherein the second socket is aligned with a pass-through of the first backplane, and wherein a card assembly comprises a first edge card connected to the first socket and a second edge card extending through the pass-through of the first backplane and connected to the second socket; and
 coupling the card assembly to a hard drive such that the hard drive is in electrical communication with the control system via the first backplane, the second backplane, and the card assembly, the first backplane coupled to the hard drive on a side of the first backplane opposite the second backplane.

16. The method of claim 15, further comprising:
routing a power signal between the control system and the hard drive via the first backplane; and
routing a data signal between the control system and the hard drive via the second backplane.

17. The method of claim 15, further comprising:
connecting a first hard drive interface connector of the card assembly to a first port of the hard drive, wherein a first cable connects at least one of the first edge card and the second edge card to the first hard drive interface connector, and wherein a second cable connects at least one of the first edge card and the second edge card to the first hard drive interface connector; and
connecting a second hard drive interface connector to a second port of the hard drive, wherein a third cable connects at least one of the first edge card and the second edge card to the second hard drive interface connector.

18. The method of claim 15, wherein the second backplane is coupled to the control system using one or more expansion cards.

19. A hard drive test system comprising:
a housing;
a control system arranged in a first compartment of the housing;
a first backplane arranged in the housing, the first backplane comprising a plurality of pass-throughs and a plurality of first sockets, the first backplane coupled to the control system such that the plurality of first sockets is in electrical communication with the control system;
a second backplane arranged in the housing and adjacent to and spaced apart from the first backplane, the second backplane comprising a plurality of second sockets each aligned with a respective pass-through of the plurality of pass-throughs, the second backplane coupled to the control system on a side of the second backplane opposite the first backplane such that the plurality of second sockets is in electrical communication with the control system;
a plurality of fixtures arranged in a second compartment of the housing, each fixture of the plurality of fixtures configured to hold a respective hard drive; and
a plurality of card assemblies each having a first edge card connected to a respective first socket of the plurality of first sockets and a second edge card extending through a respective pass-through of the plurality of pass-throughs and connected to a respective second socket of the plurality of second sockets, the plurality of card assemblies configured to couple to a plurality of hard drives such that the plurality of hard drives is in electrical communication with the control system via the first backplane, the second backplane, and the plurality of card assemblies, the first backplane configured to couple to the plurality of hard drives on a side of the first backplane opposite the second backplane,
wherein the first backplane and the second backplane separate and insulate the first compartment from the second compartment.

20. The system of claim 19, wherein a temperature in the second compartment is greater than a temperature in the first compartment.

* * * * *